United States Patent
Komatsu et al.

(10) Patent No.: US 7,110,196 B2
(45) Date of Patent: Sep. 19, 2006

(54) MAGNETIC TRANSFER METHOD AND APPARATUS

(75) Inventors: Kazunori Komatsu, Kanagawa-ken (JP); Masakazu Nishikawa, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 228 days.

(21) Appl. No.: 10/147,465

(22) Filed: May 17, 2002

(65) Prior Publication Data

US 2002/0171957 A1    Nov. 21, 2002

(30) Foreign Application Priority Data

May 18, 2001   (JP)   ............... 2001-149345

(51) Int. Cl.
*G11B 5/86* (2006.01)
(52) U.S. Cl. .................. 360/16; 360/17; 360/15
(58) Field of Classification Search ............ 360/15–17; 428/694 SG, 694 R, 694 SC
See application file for complete search history.

(56) References Cited

U.S. PATENT DOCUMENTS

| | | | | |
|---|---|---|---|---|
| 4,422,106 A | * | 12/1983 | Sawazaki | |
| 4,644,416 A | * | 2/1987 | Yamada | 360/17 |
| 6,347,016 B1 | * | 2/2002 | Ishida et al. | 360/17 |
| 6,433,944 B1 | * | 8/2002 | Nagao et al. | 360/16 |

FOREIGN PATENT DOCUMENTS

| | | | |
|---|---|---|---|
| JP | 57-158041 | * | 9/1982 |
| JP | 60-151843 | * | 8/1985 |
| JP | 63-183623 | | 7/1988 |
| JP | 10-040554 | | 2/1998 |
| JP | 10-269566 | | 10/1998 |
| JP | 2001028126 | * | 1/2001 |

OTHER PUBLICATIONS

Tanaka et al., "Characterization of Magnetizing Process for Pre-Embossed Servo Pattern of Plastic Hard Disks", Nov. 1994, IEEE Transactions on Magnetics, vol. 30, No. 6, pp. 4209-4211.*
Written Opinion for Application No. SG 200203042-7 dated Jun. 10, 2005 by Australian Patent Office.*

* cited by examiner

*Primary Examiner*—Wayne Young
*Assistant Examiner*—Daniell L. Negrón
(74) *Attorney, Agent, or Firm*—Sughrue Mion, PLLC

(57) ABSTRACT

A favorable magnetic transfer is performed on a vertical magnetic recording medium. A permanent magnet apparatus employs a transfer magnetic field generating means provided with two columnar permanentmagnets, each having a cross-sectional surface are equal to or greater than that of the track surface of the slave medium. A conjoined body formed of a slave medium, which has been initially magnetized unidirectionally in the direction perpendicular to the track surface thereof, and two master mediums, disposed on respective surfaces of the slave medium, is inserted between the permanent magnets so that a transfer magnetic field can be applied thereto in the direction substantially opposite that in which the initial magnetization has been performed. A uniform transfer magnetic field is applied over the entirety of track surface of the slave medium so as to simultaneously perform a magnetic transfer over the entirety of the track surface.

16 Claims, 3 Drawing Sheets

MAGNETIC TRANSFER METHOD AND APPARATUS

BACKGROUND OF THE INVENTION

1. Field of the Invention

The present invention relates to a magnetic transfer method and apparatus, by which a magnetic layer of a magnetic transfer master medium, on which a pattern has been formed for transferring data, and a magnetic layer of a slave medium are brought into close contact to form a conjoined body, and applying a transfer magnetic field to said conjoined body so as to magnetically transfer the data borne by the patterned magnetic layer of the master medium to the magnetic layer of the slave medium.

2. Description of the Related Art

Generally speaking, with regard to magnetic storage mediums, there is a demand for increased storage capacity and low cost. Further desired are so-called high-speed access mediums, which are capable of advantageously reading out the data of a desired location in a short time. Examples of these mediums include the high speed magnetic recording mediums (magnetic disk mediums) utilized in hard disk apparatuses and floppy disk apparatuses. So-called tracking servo technology, wherein the magnetic head accurately scans a narrow width track to reproduce signals with a high S/N ratio, plays a substantial role in attaining the high storage capacity thereof. A servo signal, address data signal, replay clock signal, etc., used for tracking are "preformatted" within a certain interval occurring in one rotation of the disk, that is, recorded on the disk in advance.

Magnetic transfer methods realizing accurate and efficient preformatting, wherein the data such as a servo signal or the like borne on a master medium is magnetically transferred therefrom to a magnetic recording medium, have been proposed in, for example, Japanese Unexamined Patent Publication Nos. 63(1988)-183623, 10(1998)-40544, and 10(1998)-269566.

According to these magnetic transfer technologies: a master medium having an uneven pattern corresponding to the data that is to be transferred to a magnetic recording medium (a slave medium) is prepared; this master medium is brought into close contact with a slave medium to form a conjoined body; and a transfer magnetic field is applied thereto, whereby a magnetic pattern corresponding to the data (e.g., a servo signal) borne on the master medium is transferred to the slave medium. Therefore, preformatting can be statically performed without changing the relative positions of the master medium and the slave medium. Not only is it possible to perform an accurate recording of the preformat data, it becomes possible to advantageously do so in an extremely short time.

However, as to the magnetic recording medium, two possibilities are horizontal magnetic recording mediums provided with a good magnetization axis in the horizontal direction in relation to the surface of the magnetic layer thereof, and vertical magnetic recording mediums provided with a good magnetization axis in the vertical direction in relation to the surface of the magnetic layer thereof; however, in current practice, horizontal magnetic recording mediums are generally employed, and the magnetic transfer technology described above has also been developed focusing mainly on the horizontal magnetic recording mediums as the magnetic recording medium of choice. On the other hand, if a vertical magnetic recording medium is employed, an even greater increase in data storage capacity can be expected in comparison to the horizontal magnetic recording mediums.

For cases in which a magnetic transfer is performed on a vertical magnetic recording medium, a magnetic field must be applied in the perpendicular direction with respect to the surface of the magnetic layer thereof; wherein the optimal conditions differ with respect to cases in which a magnetic transfer is performed on a horizontal magnetic recording medium.

SUMMARY OF THE INVENTION

The present invention has been developed in view of the circumstances described above, and it is a primary object of the present invention to provide a magnetic transfer method capable of performing a favorable magnetic transfer onto a vertical magnetic recording medium.

The magnetic transfer method according to the present invention is a magnetic transfer method comprising the steps of: conjoining the magnetic layer of a magnetic transfer master medium, on which a pattern has been formed for transferring data to a magnetic recording medium, and the magnetic layer of a slave medium to form a conjoined body; and applying a transfer magnetic field to said conjoined body so as to magnetically transfer the data borne by the patterned magnetic layer of the master medium to the magnetic layer of the slave medium;

wherein a disk shaped vertical magnetic recording medium having a concentric circular track is used as the slave medium, and after an initial direct current magnetic field has been applied unidirectionally in the direction perpendicular to the track surface of said slave medium and said slave medium has been thereby initially direct current magnetized unidirectionally in the direction perpendicular to the track surface thereof, and a magnetic transfer is performed simultaneously across the entirety of the track region of the magnetic layer of the slave medium, which has been conjoined with the magnetic layer of the master medium by disposing the conjoined body comprising the slave medium and the master medium within a transfer magnetic field generated over a region larger than the track region of said slave medium in the direction opposite that in which the initial direct current magnetic field has been applied.

Here, the expression "transferring data" refers to the imparting of a pattern corresponding to said data to the magnetized track array of the magnetic layer of the slave medium.

Further, the expressions "the track region of the slave medium" and "a concentric circular track" refer to the track region and the concentric circular track formed by the magnetic transfer.

Still further, the initial magnetization of the slave medium can be performed while the slave medium and the master medium are in the conjoined state, or while the slave medium is not in the state of conjoinment with the master medium. For cases in which the slave medium is subjected to the initial magnetization process while said slave medium is not conjoined with a master medium, the slave medium can be conjoined with a master medium after the initial magnetization has been performed.

Further, it is desirable that the intensity of the aforementioned transfer magnetic field is at least 0.5 times but not more than 3.5 times the magnetic coercive force of the magnetic layer of the slave medium.

In addition, the magnetic transfer method according to the present invention can be implemented by a magnetic transfer apparatus that performs the steps of: conjoining the magnetic layer of a magnetic transfer master medium, of which a pattern has been formed for transferring data to a magnetic recording medium, and the magnetic layer of a slave medium to form a conjoined body, and applying a transfer magnetic field to said conjoined body so as to magnetically transfer the data borne by the patterned magnetic layer of the master medium to the magnetic layer of the slave medium;

wherein the magnetic transfer apparatus comprises: an initial direct current magnetizing means for applying an initial magnetic field unidirectionally in the direction perpendicular to the track surface of a disk shaped slave medium having a concentric circular track so as to initially magnetize said slave medium unidirectionally in the direction perpendicular to the track surface thereof; and a transfer magnetic field applying means for generating a transfer magnetic field over a region larger than the track region of said slave medium and in the direction opposite that in which the initial direct current magnetic field has been applied.

Note that the transfer magnetic field applying means may also serve as the initial direct current magnetizing means.

Note that as to the transfer magnetic field generating means for applying the transfer magnetic field, although an electromagnetic apparatus or a permanent magnetic apparatus can be employed thereas, from the standpoint of the setting and adjustability of the intensity of the magnetic field and other such conditions, it is preferable that an electromagnetic apparatus be employed. On the other hand, when performing a magnetic transfer at a fixed magnetic field intensity, from the standpoints of cost effectiveness and the ability to compactly configure the apparatus, employing a permanent magnetic apparatus is preferable.

According to the magnetic transfer method of the present invention: after subjecting the slave medium, which is a vertical magnetic recording medium, to an initial direct current magnetization unidirectionally in the direction perpendicular to the surface of the track thereof; by conjoining the magnetic layer of the slave medium with the magnetic layer of a master medium to form a conjoined body, and applying a transfer magnetic field to said conjoined body in the direction substantially opposite that in which the initial magnetization has been performed so as to perform a magnetic transfer, a favorable magnetic transfer can be performed on a vertical magnetic recording medium. Further, by disposing the conjoined master and slave medium within a transfer magnetic field that is generated over an area larger than the track direction of said slave medium and in the direction substantially opposite that in which the initial magnetization has been performed, because the magnetic transfer can be performed across the entire area of the track surface simultaneously, the magnetic transfer can be performed without having to move either the magnetic field or the conjoined slave medium and master medium when applying the transfer magnetic field, whereby it becomes unnecessary to provide complex apparatuses such as a moving means. Because the magnetic transfer is performed across the entire surface of the track, the magnetic transfer can be completed in an extraordinarily short time; whereby magnetically preformatted slave mediums can be manufactured efficiently.

Further, more particularly, by making the intensity of the transfer magnetic field greater than or equal to 0.5 times and less than or equal to 3.5 times the coercive force of the magnetic layer of the slave medium, the magnetic transfer can be performed more accurately.

DESCRIPTION OF THE PREFERRED EMBODIMENTS

Figure 1:
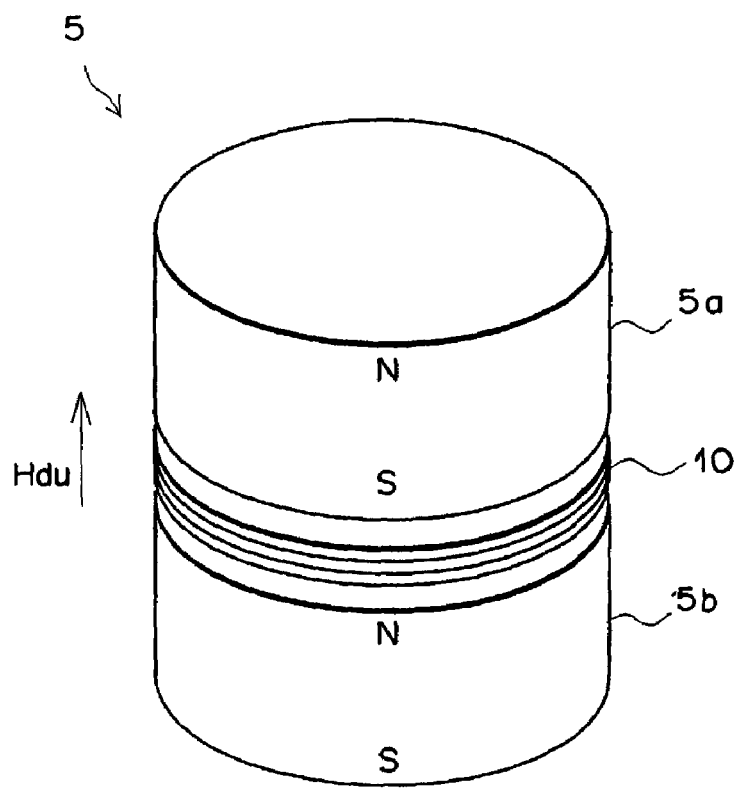
FIG. 1 is a perspective view of the main part of a transfer magnetic field applying means implementing the magnetic transfer method according to the first embodiment of the present invention.

Hereinafter the preferred embodiments of the present invention will be explained with reference to the attached drawings. FIG. 1 is a perspective view of the main part of a transfer magnetic field applying means implementing the magnetic transfer method according to the first embodiment of the present invention.

Figure 2:
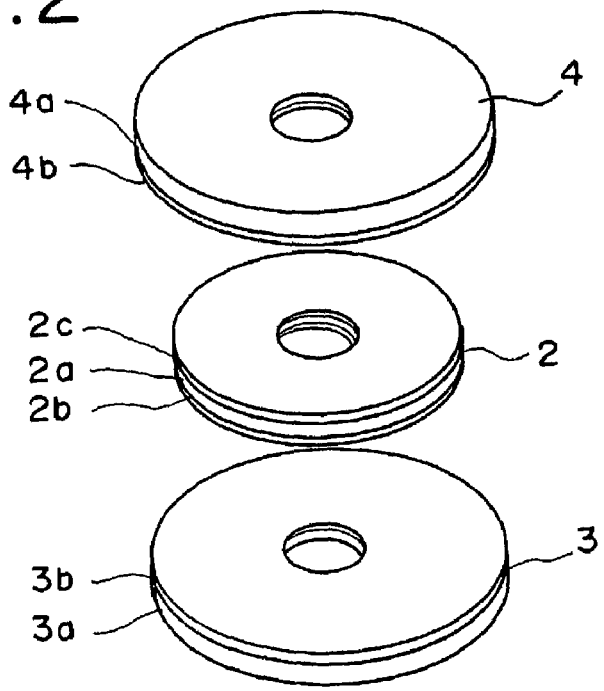
FIG. 2 is a perspective view of a master medium and a slave medium.

The transfer magnetic field generating means shown in FIG. 1 comprises a permanent magnet apparatus provided with two permanent magnets 5a and 5b. As shown in FIG. 2, each of the permanent magnets 5a and 5b of the permanent magnet apparatus are columnar permanent magnets having a cross-sectional surface area larger than the track surface area of the slave medium 2, and are disposed with the respective opposite magnetic poles facing each other so as to generate a magnetic field Hdu directed from the lower to the upper direction of the conjoined body 10. Further, because it is necessary that ample space be provided between the upper and lower permanent magnets 5a, 5b of the permanent magnet apparatus so as to facilitate the unobstructed insertion and removal of the conjoined body 10 therebetween, the permanent magnet apparatus is also provided with a separation means (not shown) for separating the permanent magnets 5a and 5b from each other. This separating means is provided so that the slave medium 2 is not affected by the magnetic field during the insertion and removal thereof between the permanent magnets 5a and 5b. Note that the magnetic field Hdu is set so as to be from 0.5 to 3.5 times the intensity of the coercive force Hcs of the slave medium.

FIG. 2 is an exploded view of a conjoined body 10. The conjoined body 10 is formed of a slave medium 2, to which the respective surfaces of the protrusion portion of the pattern formed on respective master mediums 3a and 4a are conjoined with each recording surface thereof, on which magnetic layers 2b, and 2c have been formed, respectively.

The slave medium utilized according to the magnetic transfer method of the present invention is a disk shaped magnetic recording medium such as a hard disk, a flexible disk, or the like, which has been provided with a magnetic recording layer on a single surface or on both surfaces thereof; in particular, a vertical magnetic recording medium on which a favorable magnetization direction of the magnetic recording layer has been formed in the direction perpendicular to the recording surface is utilized thereas. The slave medium 2 shown in FIG. 2 is a vertical magnetic recording medium, which is recordable on both surfaces thereof, on which magnetic layers (magnetic recording layers) 2b, 2c, are formed on both surfaces of the substrate 2a thereof, respectively.

The master medium 3 is provided with a pattern formed of protrusion portions corresponding to the data to be recorded onto the lower recording surface 2b of the slave medium 2. The master medium 4 is of the same layered configuration as the master medium 3, and is provided with a pattern formed of protrusion portions corresponding to the data to be recorded onto the upper recording surface 2c of the slave medium 2. The master mediums 3, 4 comprise a substrate 3a, 4a, respectively, on each of which a pattern of protrusion portions has been formed, and a pliable magnetic layer 3b, 4b, formed on the respective pattern bearing surfaces thereof.

Figure 3A:
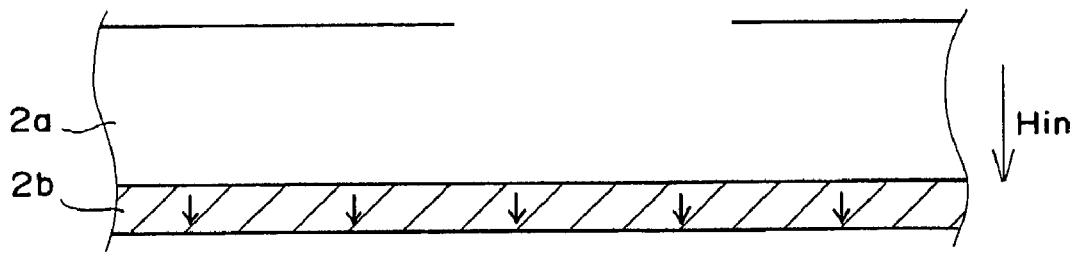
FIGS. 3A, 3B, and 3C are drawings illustrating the basic processes of a magnetic transfer method.
Figure 3B:
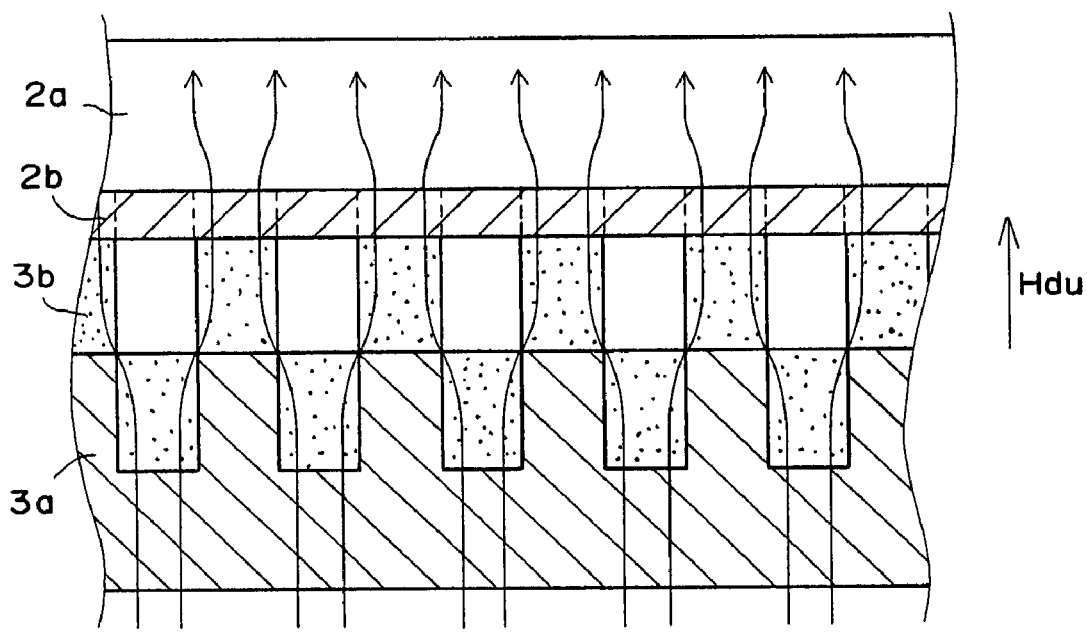
Figure 3C:
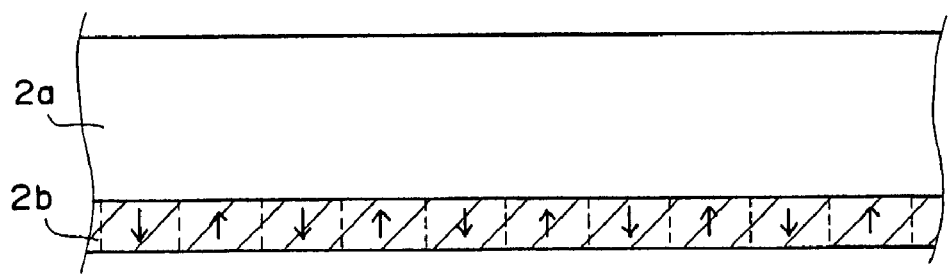

Next, the magnetic transfer method according to the present embodiment will be explained. First, with reference to FIGS. 3A, 3B, and 3C, the basic processes of the magnetic transfer will be explained. FIG. 3A illustrates the process wherein an initial magnetic field is applied unidirectionally so as to perform the initial magnetization of the slave medium. FIG. 3B illustrates the process wherein the slave medium and the master medium are conjoined to form a conjoined body, and a transfer magnetic field is applied thereto in the direction opposite the direction in which the initial magnetization has been performed. FIG. 3C shows the state of the recording surface of the slave medium after the magnetic transfer has been performed. Note that, FIG. 3 illustrates the lower face recording surface 2b of the slave medium and the lower master medium 3, and an explanation has been given for only the magnetic transfer to said lower face recording surface 2b; however, a magnetic transfer to the upper face recording surface 2c can be performed in the same manner.

As shown in FIG. 3A, an initial direct current magnetic field Hin is applied in the direction perpendicular to the track surface of the of the slave medium 2 in advance, so as to initially magnetize the recording surface 2b thereof in one direction. Then, as shown in FIG. 3B, the surface of the recording layer 2b of this slave medium 2 is conjoined with the pliable magnetic layer 3b formed on the surface of the protrusion portions of the master medium 3 to form a conjoined body, and a transfer magnetic field Hdu is applied thereto in the perpendicular to the recording layer 2b of the slave medium 2 and in opposite direction that the initial direct current magnetic field Hin has been applied (i.e., in the direction opposite the direction in which the initial magnetization has been performed) to perform the magnetic transfer. As a result, the data (a servo signal, for example) corresponding to the protrusion portions of the pattern of the data bearing surface of the master medium 3 is magnetically transferred and recorded on the magnetic recording surface 2b of the slave medium 2, as shown in FIG. 3C.

Further, even for cases in which the uneven pattern of the master medium 3 is a negative pattern, the opposite to that of the positive pattern shown in FIG. 3B, by reversing the above described directions in which the initial direct current magnetic field Hin and the transfer magnetic field Hdu are applied, the same data can be magnetically transferred and recorded.

Next, the magnetic transfer method employing the transfer magnetic field applying means shown in FIG. 1 will be explained.

First, the initial magnetization of the magnetic layers 2b, 2c of the slave medium 2 are performed by use of an initial direct current magnetizing means (not shown). That is to say, an initial direct current magnetic field Hin is applied to the slave medium 2 in the direction perpendicular to the track surface thereof, whereby the initial magnetization of the magnetic layer is performed.

Then, each of master mediums 3, 4 are conjoined to the magnetic layers 2b, 2c, respectively of the slave medium to form a conjoined body 10. Next, the conjoined body 10 is inserted between the permanent magnets 5a, 5b of the permanent magnet apparatus 5, in a state in which there is ample space separating said permanent magnets 5a, 5b, so that the transfer magnetic field Hdu will be in the direction opposite that in which the initial magnetization of the magnetic layers 2b, 2c of the slave medium has been performed. Then, the permanent magnets 5a, 5b are brought near the respective surfaces of the conjoined body 10, and the transfer magnetic field Hdu is applied to perform the magnetic transfer. Note that after the magnetic transfer has been performed, the conjoined body 10 is removed from between the permanent magnets 5a, 5b; the removal operation is performed while said permanent magnets 5a, 5b are in the state wherein there is ample separation therebetween.

According to the magnetic transfer apparatus of the present invention, by providing an initial direct current magnetizing means and a transfer magnetic field applying means as described above, a magnetic transfer can easily be performed on a vertical magnetic recording medium, and a favorable magnetic transfer can be achieved. By facilitating the performance of a favorable magnetic transfer onto a vertical magnetic recording medium, it becomes possible to easily obtain a magnetic recording medium having an even larger data storage capacity than the conventionally used high density horizontal magnetic recording mediums. Further, by providing a transfer magnetic field applying apparatus that generates the transfer magnetic field in the direction opposite that in which the initial magnetization has been performed and across an area larger than the track area of the slave medium, the magnetic transfer can be performed across the entirety of the track area of the slave medium simultaneously, whereby magnetically preformatted slave mediums can be manufactured efficiently. Still further, because a uniform magnetic field can be generated across the entirety of the track surface of the slave medium, the transfer accuracy can be improved.

According to the present embodiment, the magnetic layers 2b, 2c of the slave medium have been initially magnetized in advance, and then the master mediums 3, 4 have been conjoined therewith, respectively; however, the initial magnetization of the magnetic layers 2b, 2c of the slave medium 2 can be performed in a state wherein the slave medium 2 has been conjoined with the master mediums 3, 4.

Further, the transfer magnetic field applying means can also be used as the initial direct current magnetizing means. In this case, the upper and lower surfaces of the slave medium can be set between the permanent magnets 5a, 5b so as to be in the state when the transfer magnetic field is to be applied wherein the direction in which the transfer magnetic field Hdu is applied is the opposite of that occurring when the initial direct current magnetic field Hin is applied. Note that when performing the initial magnetization of the slave medium 2 also, in performing the insertion and removal of the slave medium 2 between the permanent magnets 5a, 5b, the two permanent magnets 5a, 5b are mutually separated to a distance wherein the magnetic layers 2b, 2c of the slave medium 2 are not affected by the magnetic fields thereof during the insertion and removal operations.

By combining the transfer magnetic field applying means and the initial direct current magnetizing means into an integrated unit, the cost of the apparatus can be kept low, and it becomes possible to provide preformatted magnetic recording mediums at an inexpensive price.

Note that it is necessary that the value employed for the intensity of the transfer magnetic field and the initial direct current magnetic fields be determined based on consideration of the coercive force of the slave medium, the relative permeability of the master medium and the slave medium, or the like. However, as described above, the intensity of the transfer magnetic field is to be a value greater than or equal to 0.5 times and less or equal to than 3.5 times the coercive force Hcs of the slave medium.

Figure 4:
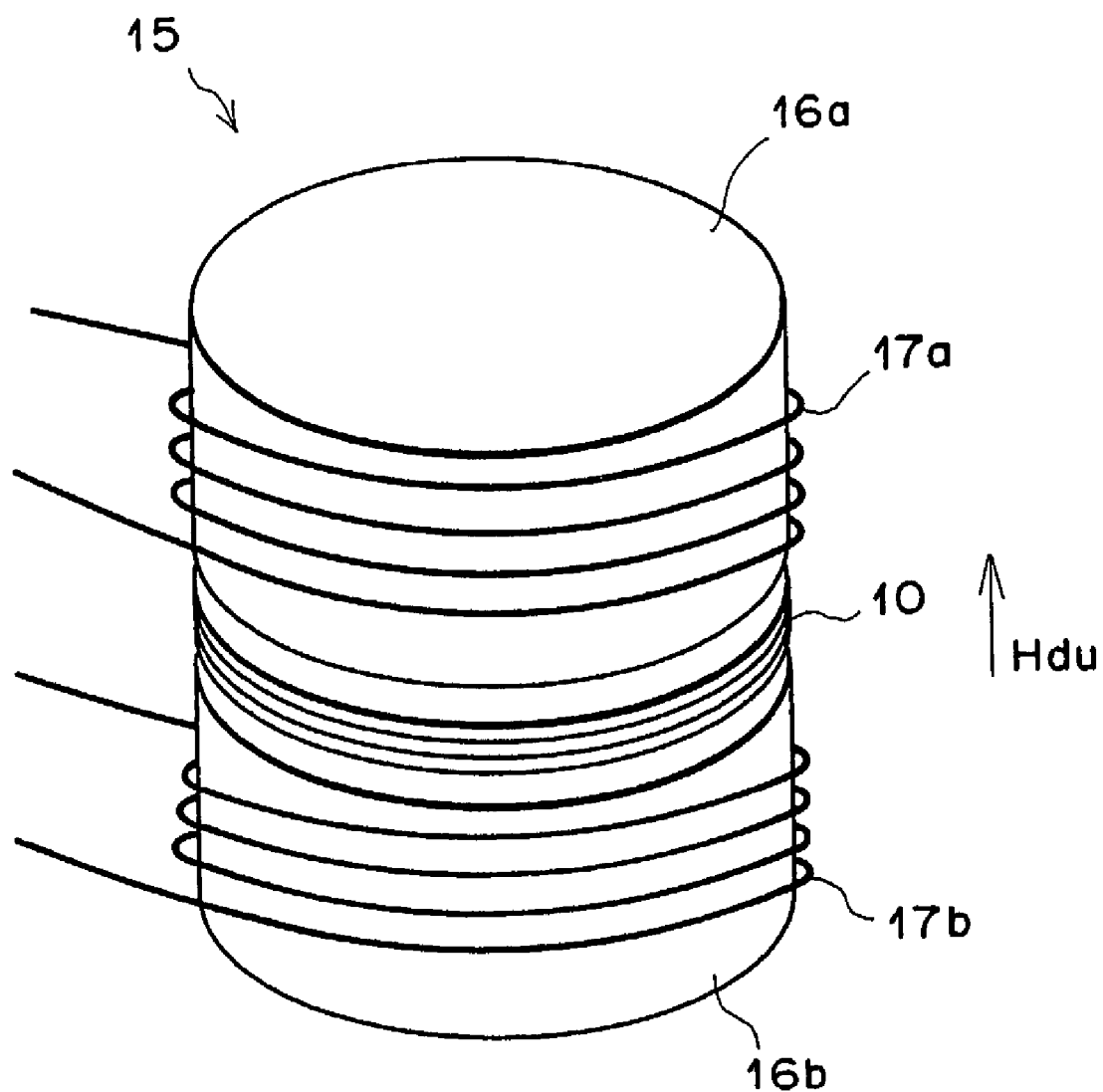
FIG. 4 is a schematic drawing of a transfer magnetic field applying means according to another embodiment of the present invention.

According to the above-described embodiment, although a permanent magnet apparatus 5 has been employed for explanatory purposes as the magnetic field generating means, an electromagnetic apparatus 15 such as that shown in FIG. 4 can also be employed thereas. The electromagnetic apparatus 15 shown in FIG. 4 is disposed both above an below the conjoined body 10, and comprises two electromagnets, each formed of a respective columnar core 16a, 16b, which is of substantially the same cross-sectional surface area as the track surface of the slave medium 2, around which a respective coil 17a, 17b has been wound. The magnetic transfer method employing this electromagnetic apparatus 15 is substantially the same as that described above. If the electromagnetic apparatus 15 is employed, it becomes possible to easily change the direction and intensity of the magnetic field.

Note that according to the forgoing description, the transfer magnetic field has been applied to a slave medium and master medium(s) that have been conjoined to form a conjoined body; however, the transfer magnetic field can also be applied while the slave medium and the master medium(s) are in the state wherein said mediums have been brought into close proximity and maintained at a uniform separation distance.

Next a detailed explanation of the master medium and the slave medium will be provided.

As described above, the master medium 3 comprises a substrate 3a having protrusion portions formed in a pattern on the surface thereof, and a pliable magnetic layer 3b formed on said surface (over the protrusion portions and the depression portions between the protrusion portions). A synthetic resin, a ceramic material, an alloy, aluminum, glass, quartz, silicon, nickel, or the like is used to form the substrate 3a of the master medium 3. The uneven pattern can be formed by use of a stamping method, a photo fabrication method, or the like. Further, as to the material forming the pliable magnetic layer, Co, a Co alloy (CoNi, CoNiZr, CoNbTaZr, or the like), Fe, an Fe alloy (FeCo, FeCoNi, FeNiMo, FeAlSi, FeAl, FeTaN), Ni, a Ni alloy (NiFe), or the like can be employed therefor; it is particularly preferable that FeCo, or FeCoNi be employed. For cases in which the substrate 3a is a ferromagnetic body formed of Ni or the like, although it is not necessary to provide the magnetic layer 3b, the magnetic transfer can be improved if a magnetic layer 3b is provided. If the substrate 3a is formed of a non-magnetic body, it is necessary to provide the magnetic layer 3b.

The protrusion portions of the pattern on the data bearing surface of the master medium 3 can be formed by use of a stamping method, a photo fabrication method, or the like. Here, a master medium manufactured by use of a stamping method will be explained.

First, a layer of photoresist is formed on the smooth, flat surface of a glass substrate (or a quartz substrate) by use of a spin coating process; then, a laser beam (or an electron beam), which is modulated in correspondence to a servo signal, is emitted while this glass substrate is being rotated, and a predetermined pattern, such as that of a servo signal extending linearly in the radial direction from the rotational center of each track, is exposed over the entire surface of the photoresist on the portions corresponding to each frame on the circumference. Then, the photoresist is subjected to a development process, the exposed portion of the photoresist is removed and an original disk having an uneven pattern formed by the remaining photoresist is obtained thereby. Next, the surface of the uneven pattern thus formed on the surface of the original disk is subjected to a plating process (electroforming), whereby an Ni substrate having a positive uneven pattern is formed; said Ni substrate is then peeled away from the original disk. This Ni substrate can be employed as a master medium as is, or after a pliable magnetic layer or a protective layer has been further applied over the uneven pattern thereof, as required.

Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by hardening of a synthetic resin impressed onto the second original disk; this third original disk can be metal plated to obtain a substrate having a positive uneven pattern.

On the other hand, after the uneven pattern has been formed of photoresist on the glass substrate, etching can be performed to form holes in the glass substrate, whereby a substrate from which photoresist has been removed can be obtained; a substrate can be formed therefrom based on any of the methods described above.

Ni or a Ni alloy can be used as the material to form a metallic substrate, and any of various types of methods for plating a metallic layer, including electroless deposition methods, electroformation methods, sputtering methods, and ion plating methods can be employed as the metallic film formation method used to form this substrate. It is preferable that the height of the protrusions (the depth of the uneven pattern) formed on the substrate be in the range of 80–800 nm. For cases in which this uneven pattern is that of a servo signal, said pattern is formed long in the radial direction of thereof. For example, it is preferable that the length in the radial direction be 0.05–20 um, and 0.05–5 um in the circumferential direction; it is preferable that a pattern of this type, in which the length in the radial direction is long and within this range, is selected as the pattern for bearing servo signal data.

The magnetic layer 3b, which is provided on the uneven pattern of the substrate, is formed of a magnetic material and by use of a vacuum film forming means such as a vacuum deposition method, a sputtering method, an ion plating method, or by a metal plating method, etc. It is preferable that the thickness of the magnetic layer 3b be in the range of 50–500 nm, and even more preferably, in the range of 80–300 nm.

Note that it is preferable that a Diamond Like Carbon (DLC) or other type of protective layer is formed on the magnetic layer, and a lubricating layer can also be provided. Also, a contact enhancing layer formed of Si or the like can also be provided. The lubricant serves to improve the durability with respect to surface damage due to friction or the like when correcting misalignments occurring during the conjoining process.

Note that according to the forgoing description, a master medium on which an uneven pattern has been formed on the surface thereof has been explained; however, a master medium having a flat surface formed by filling in the depression portions of the uneven pattern formed thereon with a magnetic layer can also be employed. In this case, the pattern of the substrate is formed by the magnetic layer filling in the depression portions.

The slave medium 2, as described above, is a disk shaped magnetic recording medium such as a hard disk, a high density (HD) flexible disk or the like; wherein the magnetic recording layer thereof is formed by coating a layer of magnetic material, or by forming a thin metallic magnetic film recording layer on the surface thereof. Note that here, a magnetic layer is provided with magnetic anisotropy that has an easily magnetizable axis in the direction perpendicular to the track surface thereof. As to the material forming the thin metallic magnetic film recording layer, Co, a Co alloy (CoPtCr, CoCr, CoPtCrTa, CoPtCrNbTa, CoCrB, CoNi or the like), Fe, or an Fe alloy (FeCo, FePt, FeCoNi) can be employed therefor. Note that it is preferable that a non-magnetic sub layer be provided so as to provide the magnetic anisotropy required beneath the magnetic material (on the support body side thereof). The crystalline structure and the lattice coefficient of the non-magnetic sub layer must be matched to those of the magnetic recording layer; to this end, Cr, CrTi, CoCr, Crta, CrMo, NiAl, Ru, Pd or the like is employed. Further, it is preferable that a backing layer for stabilizing the state of the vertical magnetization of the magnetic layer, and improving the recording and playback sensitivity be provided under the non-magnetic sub layer.

Note that it is preferable that the thickness of the magnetic recording layer be greater than or equal to 10 nm and less than or equal to 500 nm, and more preferably, greater than or equal to 20 nm and less than or equal to 200 nm. Further, it is preferable that the thickness of the non-magnetic layer be greater than or equal to 10 nm and less than or equal to 150 nm, and more preferably, greater than or equal to 20 nm and less than or equal to 80 nm. Still further, it is preferable that the thickness of the backing layer be greater than or equal to 50 nm and less than or equal to 2000 nm, and more preferably, greater than or equal to 80 nm and less than or equal to 400 nm.

What is claimed is:

1. A magnetic transfer method comprising the steps of: conjoining a magnetic layer of a magnetic transfer master medium, on which a pattern has been formed for transferring data to a magnetic recording medium, and a magnetic layer of a slave medium to form a conjoined body; and applying a transfer magnetic field to said conjoined body so as to magnetically transfer the data borne by said patterned magnetic layer of the master medium to the magnetic layer of the slave medium, wherein
   the magnetic layer of the magnetic transfer master medium is formed on a substrate of the magnetic transfer master medium;
   a disk shaped vertical magnetic recording medium having a concentric circular track is used as said slave medium, and
   after an initial direct current magnetic field has been applied unidirectionally in the direction perpendicular to the track surface of said slave medium and said slave medium has been thereby initially direct current magnetized unidirectionally in the direction perpendicular to the track surface thereof,
   a magnetic transfer is performed simultaneously across the entirety of the track region of the magnetic layer of the slave medium, which has been conjoined with the magnetic layer of the master medium by disposing the conjoined body comprising the slave medium and the master medium within a transfer magnetic field generated over a region larger than the track region of said slave medium in the direction opposite that in which the initial direct current magnetic field has been applied.

2. A magnetic transfer method as defined in claim 1, wherein
   the intensity of the transfer magnetic field is greater than or equal to 0.5 times and less than or equal to 3.5 times the coercive force of the magnetic layer of the slave medium.

3. A magnetic transfer method as defined in claim 1, wherein
   the magnetic transfer master medium comprises a substrate provided with a surface on which an uneven pattern corresponding to the data has been formed, and
   a magnetic layer formed on at least the surfaces of protrusion portions of said substrate, whereby
   by disposing the magnetic layer on said protrusion portions surface, the patterned magnetic layer is formed.

4. A magnetic transfer method as defined in claim 1, wherein
   said data is a servo signal.

5. A magnetic transfer apparatus that is an apparatus for conjoining a magnetic layer of a magnetic transfer master medium, on which a pattern has been formed for transferring data to a magnetic recording medium, and a magnetic layer of a slave medium to form a conjoined body, and applying a transfer magnetic field to said conjoined body so as to magnetically transfer the data borne by said patterned magnetic layer of the master medium to the magnetic layer of the slave medium, comprising:
   an initial direct current magnetizing means for applying an initial magnetic field unidirectionally in the direction perpendicular to the track surface of a disk shaped slave medium having a concentric circular track so as to initially magnetize said slave medium unidirectionally in the direction perpendicular to said track surface, and
   a transfer magnetic field generating means for generating a transfer magnetic field over a region larger than said track region of said slave medium and in the direction opposite that in which the initial direct current magnetic field has been applied;
   wherein the magnetic layer of the magnetic transfer master medium is formed on a substrate of the magnetic transfer master medium.

6. A magnetic transfer apparatus as defined in claim 5, wherein
   said transfer magnetic field generating means generates a transfer magnetic field of which the intensity is greater than or equal to 0.5 times and less than or equal to 3.5 times the coercive force of the magnetic layer of the slave medium.

7. A magnetic transfer apparatus as defined in claim 5, wherein
   said transfer magnetic field applying means also serves as said initial direct current magnetizing means.

8. A magnetic transfer apparatus as defined in claim 5, wherein
   said transfer magnetic field applying means is an electromagnetic apparatus.

9. A magnetic transfer apparatus as defined in claim 5, wherein said transfer magnetic field applying means is a permanent magnet apparatus.

10. A magnetic transfer apparatus as defined in claim 5, wherein
said magnetic transfer master medium comprises a substrate 5 provided with a surface on which an uneven pattern corresponding to the data has been formed, and
a magnetic layer formed on at least the surfaces of protrusion portions of said substrate, whereby
by disposing the magnetic layer on said surfaces of said protrusion portions, the patterned magnetic layer is formed.

11. A magnetic transfer apparatus as defined in claim 5, wherein
said data is a servo signal.

12. A magnetic transfer apparatus as defined in claim 5, wherein the magnetic layer of the magnetic transfer master medium has a thickness of 50–500 nm.

13. A magnetic transfer apparatus as defined in claim 12, wherein the magnetic layer of the magnetic transfer master medium has a thickness of 80–300 nm.

14. A magnetic transfer apparatus as defined in claim 5, wherein the magnetic layer of the slave medium has a thickness of 10–500 nm.

15. A magnetic transfer apparatus as defined in claim 14, wherein the magnetic layer of the slave medium has a thickness of 20–200 nm.

16. The magnetic transfer apparatus of claim 5, wherein the magnetic field generating means generates the transfer magnetic field across an entirety of the track region of the slave medium.

* * * * *